United States Patent [19]

Firmin

[11] 4,317,305
[45] Mar. 2, 1982

[54] ARTIFICIAL LURE

[75] Inventor: Herman P. Firmin, Baton Rouge, La.

[73] Assignee: Knight Manufacturing Company, Inc., Tyler, Tex.

[21] Appl. No.: 173,188

[22] Filed: Jul. 28, 1980

[51] Int. Cl.³ .............................................. A01K 85/00
[52] U.S. Cl. .................................. 43/42.24; 43/42.26; 43/42.28
[58] Field of Search ................. 43/42.02, 42.03, 42.22, 43/42.24, 42.26, 42.27, 42.28, 42.29, 42.3; 46/92

[56] References Cited

U.S. PATENT DOCUMENTS

| D. 239,447 | 4/1976 | Radcliff | D22/27 |
|---|---|---|---|
| D. 240,426 | 7/1976 | Haven | D22/27 |
| 994,927 | 6/1911 | Jefferson | |
| 1,766,279 | 6/1930 | Brown | |
| 2,785,497 | 3/1957 | Berry | 43/42.26 |
| 2,795,075 | 6/1957 | Christian | 43/42.22 |
| 2,854,779 | 10/1958 | Jackson | 43/37 |
| 3,068,604 | 12/1962 | Nyberg | 43/42.24 |
| 3,218,750 | 11/1965 | Lewin | 43/42.28 |
| 3,490,165 | 1/1970 | Thomassin | 43/42.09 |
| 3,735,518 | 5/1973 | Kleine et al. | 43/42.03 |
| 3,942,280 | 3/1976 | Ryder et al. | 43/42.22 |
| 4,044,492 | 8/1977 | Ingram | 43/42.28 |

FOREIGN PATENT DOCUMENTS 984718 3/1965 United Kingdom .............. 43/42.22

Primary Examiner—Stephen G. Kunin
Assistant Examiner—K. Bradford Adolphson
Attorney, Agent, or Firm—Richards, Harris & Medlock

[57] ABSTRACT

An artificial lure (10) is provided which simulates the natural motion of a living creature as the lure is drawn through water. The lure (10) comprises a resilient body (12) having a head portion (26), a mid-body portion (28) and a tail portion (30). The mid-body portion narrows in a first direction to form a hinge section (38) and protrusions (40, 42) extend outwardly from opposite sides of the mid-body portion (28) adjacent the hinge section (38). Recesses (44, 46) are formed by the protrusions. As the lure is drawn through water, the flow along the lure induces oscillation in the tail portion (30) which resembles the motion of the living creature.

9 Claims, 6 Drawing Figures

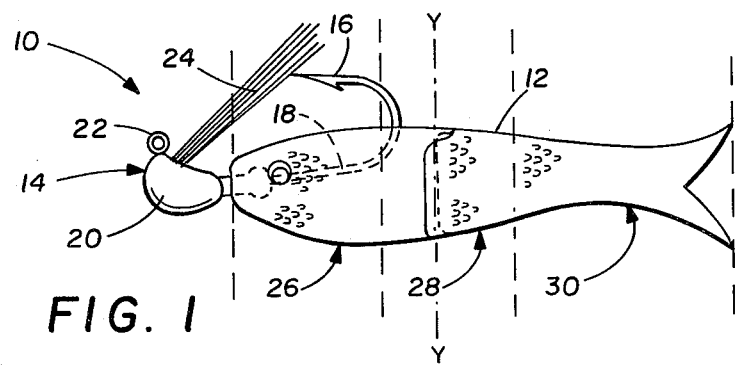
FIG. 1
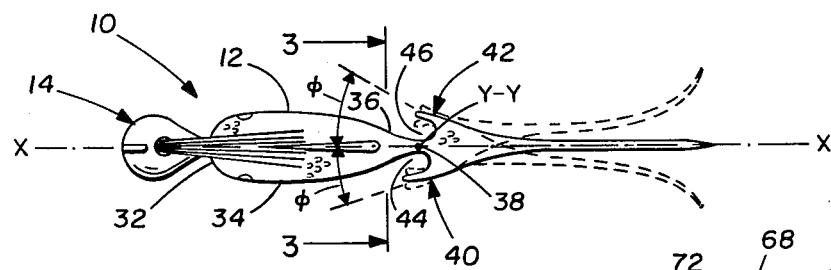
FIG. 2
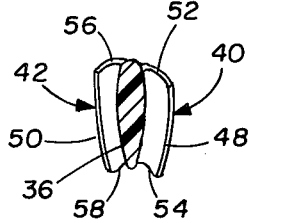
FIG. 3
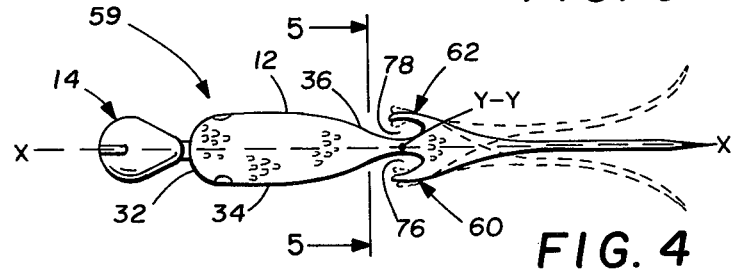
FIG. 4
FIG. 5
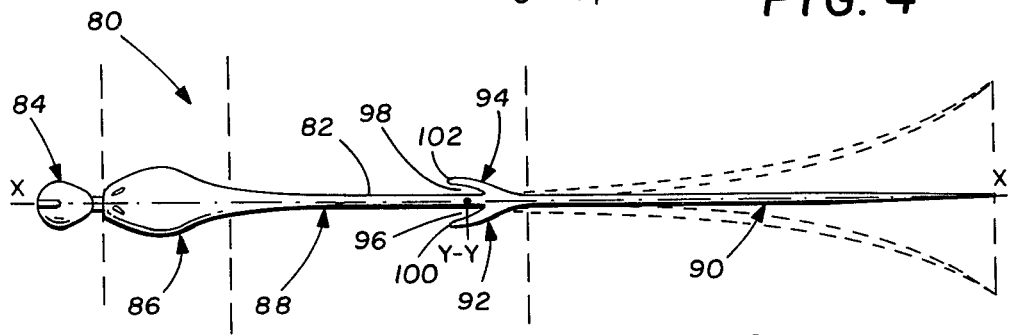
FIG. 6

4,317,305

ARTIFICIAL LURE

TECHNICAL FIELD

This invention relates to the art of fishing, and in particular to an artificial lure for attracting and catching fish.

BACKGROUND ART

Fishing for commercial or sporting purposes is undeniably a major industry. In designing an artificial or manmade lure containing a hook or a barb, a major goal is to design a lure that will be attractive to the fish, as for example, one mistaken by the fish as food. When the fish attempts to eat the lure, the fish will be hooked.

Several attempts have been made to create artificial lures simulating living creatures to which a fish would be attracted. Several examples of these attempts are disclosed in U.S. Pat. No. 2,854,779, issued Oct. 7, 1958, U.S. Pat. No. 2,785,497, issued Mar. 19, 1957 and U.S. Pat. No. 994,927 issued June 13, 1911.

Although prior lures have tended to catch fish in certain circumstances, a need has arisen for a fishing lure that closely resembles the actual living creature being simulated. For example, prior artificial minnow lures have not provided a realistic approximation of the swimming action of a real minnow when the lures have been towed through the water. Many of such artificial lures have not been flexible and thus have not been realistic. Other prior lures have been flexible, but have wiggled the head portion when towed rather than the tail portion as with a living minnow. Similar problems of nonrealistic movement during towing have been experienced with other lures such as worms, snakes and the like.

DISCLOSURE OF THE INVENTION

In accordance with the present invention, an artificial lure is provided which closely approximates the movement of a live animal when towed through the water.

In accordance with the present invention, an artificial lure is provided which comprises a body having a head portion, a mid-body portion and a tail portion, said mid-body portion having protrusions for inducing oscillation of said tail portion in a manner resembling the motion of a living creature as the lure is drawn through water.

In accordance with another aspect of the present invention, an artificial lure is provided which comprises an integral resilient body having a head portion, a mid-body portion and a tail portion. The mid-body portion extends rearwardly from the head portion, decreasing in thickness in a first dimension to form a hinge section and increasing in thickness in the first dimension rearward of the hinge section to form protrusions adjacent the hinge section. The tail portion extends rearward of the mid-body portion. Drawing the lure through water induces oscillation in the tail portion in a manner resembling the motion of a living creature.

In accordance with yet another aspect of the present invention, an improved fishing lure of the type having a body defining a head portion, a mid-body portion and a tail portion is provided. The improvement comprises a body formed from an elastomeric material having a hinge section formed in the mid-body portion so that the tail portion may pivot about the hinge section relative to the head portion and protrusions extending from opposite sides of the mid-body portion to induce motion in the tail portion in a manner simulating the motion of a living creature as the lure is drawn through water.

BRIEF DESCRIPTION OF THE DRAWINGS

A more complete understanding of the invention may be had by reference to the following Detailed Description when taken in conjunction with the accompanying Drawings, wherein:

FIG. 1 is a side view of the artificial lure forming the present invention;

FIG. 2 is a top view of the artificial lure forming the present invention;

FIG. 3 is a vertical cross section of the artificial lure taken along line 3—3 of FIG. 2 in the direction of the arrows;

FIG. 4 is a top view of a second embodiment of the artificial lure forming the present invention;

FIG. 5 is a vertical cross section of the second embodiment of the artificial lure taken along line 5—5 of FIG. 4 in the direction of the arrows; and FIG. 6 is a top view of a third embodiment of the artificial lure forming the present invention.

DETAILED DESCRIPTION

Referring now to the Drawings, wherein like reference characters designate like or corresponding parts throughout several views, a first embodiment of an artificial lure 10 forming the present invention is illustrated in FIGS. 1-3. The artificial lure 10 includes two major assemblies, a resilient body 12 and a hook assembly 14. The resilient body 12 is preferably formed or molded of a suitable elastomeric material selected from the thermoplastic polymer family, such as, for example, polyvinyl chloride (PVC). The resilient body 12 is mounted on the hook assembly 14 by inserting the hook assembly 14 therein.

The hook assembly 14 comprises a barb or hook 16 formed at one end of a shank 18. The opposite end of the shank 18 is secured to a weight member 20 having an eye 22 secured thereto for attaching fishing line. A number of flexible filaments may be secured to weight member 20 to form a weed deflector 24 for deflecting objects that might otherwise entangle the hook as the lure is drawn through the water.

The body 12 consists of three major portions, a head portion 26, a mid-body portion 28 and a tail portion 30. The head portion 26 defines a relatively blunt nose 32 and extends rearwardly to define a section 34 of relatively uniform thickness.

The mid-body portion 28 extends rearward of the head portion 26 and is integral therewith. The mid-body portion 28 includes a section 36 extending rearwardly from section 34 of the head portion 26. The thickness of section 36 decreases on both sides of the medial plane X—X, dividing the lure 10 into half portions, to form a hinge section 38. The hinge section 38 may pivot about an axis Y—Y lying in the medial plane X—X. Rearward of the hinge section 38, the mid-body portion 24 expands outwardly away from medial plane X—X and forward to form flexible protrusions or side fins 40 and 42 generally extending at a preselected angle $\phi$ from either side of the medial plane. The shape of mid-body portion 28 defines cavities or recessed portions 44 and 46 on either side of the medial plane.

In the preferred embodiment illustrated in FIGS. 1-3, the leading edge 48 of protrusion 40 is positioned relatively forward of the leading edge 50 of protrusion 42.

The recess 46 defined between protrusion 42 and section 36 may extend rearward of protrusion 44 as shown in FIG. 2. In addition, the upper edge 52 and lower edge 54 of protrusion 40 may also be positioned below the upper edge 56 and lower edge 58 of protrusion 42 as shown in FIG. 3 along the vertical dimension of the lure, i.e. the protrusion 42 is centered above protrusion 40.

As the fishing lure 10 is drawn through the water, the flow past the lure and in association with the protrusions 40 and 42 induces pivotal motion in hinge section 38 about axis Y—Y. This pivotal motion induces oscillation or a rippling effect in the tail portion 30 on either side of the medial plane X—X as shown in the phantom lines in FIG. 2. Such oscillation involves a periodic movement of water past the protrusions 40 and 42 to provide a wiggling action of tail portion 30. While pivotal motion is induced about the hinge section 38 and oscillation is induced in the tail portion 30, the head portion remains relatively still. This action is very similar to the motion of a living creature such as a minnow swimming through the water.

A number of variables may be selected to provide the most lifelike motion as the lure 10 is drawn through the water. The angle $\phi$ between the protrusions 40 and 42 and the medial plane X—X may be varied. Further each protrusion may extend at a different angle from the plane. The relative positioning of the leading edges 48 and 50, upper edges 52 and 56 and lower edges 54 and 58 may be varied. In addition, the thickness of the hinge section 38 may be varied and the shape, thickness and flexibility of protrusions 40 and 42 and recessed portions 44 and 46 may be altered as desired. Such variations can provide slightly different action to the lure. However, it is important that the protrusions be dimensioned in association with the hinge section 38 so as to allow the wiggling of the tail portion 30 by the action of the water.

While the artificial lure 10 illustrated in FIGS. 1–4 is designed to resemble a fish such as a minnow, the principles of the present invention may be applied to construct an artificial lure resembling a tadpole, grub, shrimp, snake, worm, crayfish, or bullfrog or other living creature. The selection of the design of the lure will be dependent upon the particular feeding preferences of the species of fish sought. The lure 10 illustrated in the accompanying FIGURES may also be painted or formed of a material designed to attract the fish and may have eyes and scales painted thereon as shown.

In a second embodiment of the present invention, an artificial lure 59 is shown in FIGS. 4 and 5 and includes protrusions or side fins 60 and 62. The leading edges 64 and 66 of the protrusions 60 and 62 are situated at aligned positions along the length of the lure and the upper and lower edges 68, 70, 72 and 74 of the protrusions are situated at aligned positions along the vertical dimensions of the lure. The recesses 76 and 78 defined by the body of the lure 10 forming the second embodiment are also formed at aligned positions along the length of the lure. When the lure illustrated in FIG. 4 is drawn through the water, the action of the water past protrusions 60 and 62 causes the body to pivot about the hinge section of the lure and the tail portion oscillates in a manner resembling the motion of a living creature.

In a third embodiment of the present invention, an artificial lure 80 is shown in FIG. 6 and is designed to resemble a snake. The artificial lure 80 also includes two major assemblies, a resilient body 82 and a hook assembly 84. The body 82 consists again of three portions, a head portion 86, a mid-body portion 88 and a tail portion 90.

The thickness of the body 82 is relatively uniform along the length of the mid-body portion 88 and tail portion 90. However, the mid-body portion 88 expands outwardly away from medial plane X—X and forward to form protrusions or side fins 92 and 94 generally extending at a preselected angle from either side of the medial plane. Recessed portions 96 and 98 are formed between the protrusions 92 and 94 and the mid-body portion 88, respectively. The leading edges 100 and 102 of protrusions 92 and 94, respectively, are situated at aligned positions along the length of the lure. The upper edges 104 and 106 of the protrusions 92 and 94, respectively, and the lower edges (not shown) of the protrusions are situated at aligned positions along the vertical dimensions of the lure 80. When lure 80 is drawn through the water, the tail portion 90 osillates on either side of the medial plane X—X as shown in the phantom lines in FIG. 6. This oscillation resembles the motion of a living creature.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. An artificial lure comprising:
an integral resilient elongate body forming a lure and having a head portion, a mid-body portion, and a tail portion along its length, said mid-body portion extending rearwardly from said head portion and decreasing in thickness in a first dimension to form a hinge section and increasing in thickness in the first dimension in the region of said hinge section to form side fins extending outwardly and forwardly toward said head portion forming recesses on either side of the body adjacent said hinge section, said side fins extending generally along the height of said mid-body portion and being positioned to interfere with the flow of water past said body as the lure is drawn through water in order to cause oscillation of said tail portion, said tail portion extending rearward of said mid-body portion and of said protrusions and oscillating in a manner resembling the motion of a living creature as the lure is drawn through water.

2. The artificial lure of claim 1 wherein said head portion remains relatively still as the lure is drawn through water.

3. The artificial lure of claim 1 wherein said side fins extend on opposite sides of said mid-body portion, one of said side fins positioned relatively forward of the opposite side fin.

4. The artificial lure of claim 1 wherein said side fins extend on opposite sides of said mid-body portion, one of said side fins extending above the opposite side fin.

5. The artificial lure of claim 1 wherein said body is formed from an elastomeric material.

6. An artificial lure comprising:
an elongate resilient body having a head and tail portion integrally connected to a narrow mid-body portion to form a hinge section for pivotal motion about a pivotal axis, said body further having protrusions forming a pair of side fins extending outwardly from opposite sides of said body behind said hinge section, said side fins being adjacent said hinge section and extending forward in the direction of motion of the lure as the lure is drawn through water, said side fins extending generally along the height of said mid-body portion and at a preselected angle from said body to define recesses on opposite sides of the lure; and said tail portion of said lure behind said hinge section being oscillated about said pivotal axis as the lure is drawn through water as the side fins and recesses interfere with the flow of water along the lure so that said tail portion of the lure oscillates to resemble the motion of a living creature, said head portion of the lure forward of said hinge section being maintained relatively still.

7. The artificial lure of claim 6 wherein one of said protrusions extends relatively forward of the protrusion on the opposite side of the lure.

8. The artificial lure of claim 6 wherein one of said protrusions is centered above the protrusion on the opposite side of the lure.

9. The artificial lure of claim 6 wherein the lure is molded from an elastomeric material.

* * * * *